No. 789,811. Patented May 16, 1905.

UNITED STATES PATENT OFFICE.

GEORGE F. KUNZ, OF NEW YORK, N. Y.

LUMINOUS COMPOSITION.

SPECIFICATION forming part of Letters Patent No. 789,811, dated May 16, 1905.

Application filed September 24, 1903. Serial No. 174,492. (Specimens.)

*To all whom it may concern:*

Be it known that I, GEORGE F. KUNZ, a citizen of the United States of America, residing at New York city, in the county of New York and State of New York, have invented certain new and useful Improvements in Luminous Compositions, of which the following is a specification.

My invention has reference to radio-active luminous compositions, and particularly to a composition containing a radio-active substance, such as a radium compound, and a radio-responsive substance, such as willemite, the object of my invention being to produce a composition having a much greater luminosity than either of the isolated radio-active or radio-responsive constituent parts.

Up to the present time radium as an element has not been isolated and is only known in the compound form as radium chlorid, radium bromid, radium barium carbonate, &c., although radium is believed to be an element, as its spectrum contains several positively new lines.

Among the list of known radio-active substances which can be used in carrying out my invention may be mentioned radium compounds. I have determined by experiment that the luminosity of these radio-active substances may be greatly increased by mixing therewith certain substances having radio-responsive properties—that is to say, such substances which become luminous or are rendered more highly luminous when brought into contact with substances of higher radio-activity. As such may be mentioned willemite, zinc sulfid, phosphorescent calcium sulfid, kunzite, &c.

In carrying out my invention I mix, as an example, pulverulent or granular radium material—say radium barium carbonate and pulverulent or granular willemite—in variable or equal proportions. The mixture so produced possesses a lasting luminosity exceeding that of the radium material in a marked degree. A like effect is produced by mixing the radium material or other radio-active material directly with sulfid of zinc or zinc oxid and other natural or artificial compounds of zinc, even if some of the latter be of low radio-responsiveness. Similar effects may be obtained by substituting other radio-active and radio-responsive bodies for those just mentioned. If the materials are of high radio-activity, ordinary glass holds back certain rays, presumably ultra-violet, which do not penetrate the glass. From experiment, however, it is known that quartz (rock-crystal) permits the free passage of the ultra-violet or other rays obstructed by ordinary glass, and it is therefore best to use either bottles or vials of quartz (rock-crystal) or small flat or hemispherical plates of this substance to be inserted in the glass, wood, or other receptacle for the luminous compositions, thus permitting the free passage of all the radio-active rays. Ordinary glass will answer for materials of low radio-activity.

The composition may be used dry in powdered form or it may be mixed with a liquid, either acid, alkaline, or neutral—such as water, petroleum, or with an oil, varnish, or other liquid—to form a luminous paint without affecting its radio-activity.

While I have herein described and claimed specifically a composition of radio-active material and willemite or zinc compound, the broad invention of a composition containing any one or all the radio-active and radio-responsive materials is made the subject-matter of my copending application, Serial No. 186,381, filed December 23, 1903.

What I claim as new is—

1. A luminous composition containing radio-active material, willemite and liquid.
2. A luminous composition containing radio-active material, willemite and oil.
3. A luminous composition containing radio-active material, willemite and translucent covering or casing.
4. A luminous composition containing radio-active material, willemite and casing or covering of rock-crystal.
5. A luminous composition containing radio-active material, zinc compound and rock-crystal covering or casing.
6. A composition containing radio-active material and willemite.

7. A luminous composition containing radium material and willemite.

8. A luminous composition containing radio-active material and willemite.

9. A luminous composition containing radio-active material, willemite and a vehicle.

In testimony whereof I have hereunto set my hand in the presence of two subscribing witnesses.

GEORGE F. KUNZ.

Witnesses:
A. FAPER DU FAUR, Jr.,
HENRY ARMBRUSTER.